E. COOPER.
Hay Loader.

No. 105,308. Patented July 12, 1870.

Witnesses:
E. J. Sommer
Phil. T. Dodge

Inventor
E. Cooper
by Dodge & Munn
his Att'ys

United States Patent Office.

EMMETT COOPER, OF THERESA, NEW YORK.

Letters Patent No. 105,308, dated July 12, 1870.

---

IMPROVEMENT IN HAY-LOADERS.

---

The Schedule referred to in these Letters Patent and making part of the same.

---

To all whom it may concern:

Be it known that I, EMMETT COOPER, of Theresa, in the county of Jefferson and State of New York, have invented certain Improvements in Hay-Loaders, of which the following is a specification, reference being had to the accompanying drawing.

My invention relates to hay-loaders, and consists in mounting upon wheels, on two separate frames, two endless aprons, at right angles to each other, and so constructing and arranging them, in connection with certain mechanical devices, that they shall be operated by the wheels on which they are mounted, in such a manner that one of them will gather the hay and deliver it to the other, and the latter convey the hay thus received, and deliver it onto a wagon, alongside of which the hay-loader may be arranged to run, as hereinafter explained.

In the drawing—

My hay-loader is so constructed as to run on four wheels, E E' and F F', made out of any suitable materials, and of any size desired.

These wheels are placed on axles D D', and two of them, E and F, are keyed, or otherwise rigidly attached to their respective axles.

Figure 1:
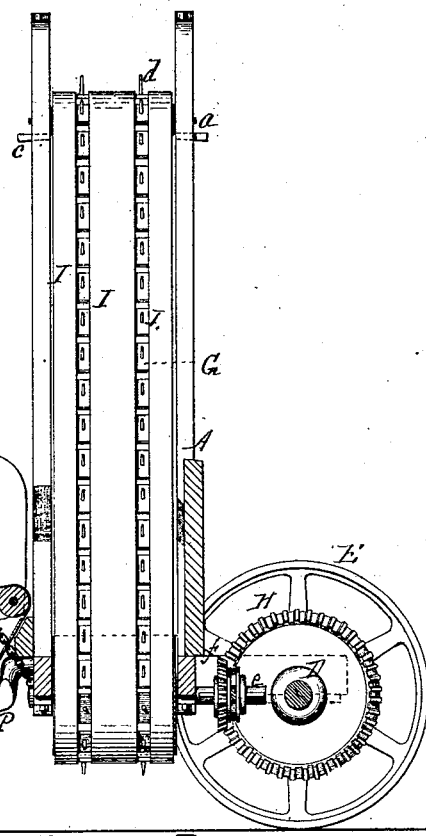
Figure 1 is a vertical section on the line $x$ $x$ of fig. 2.
Figure 2:
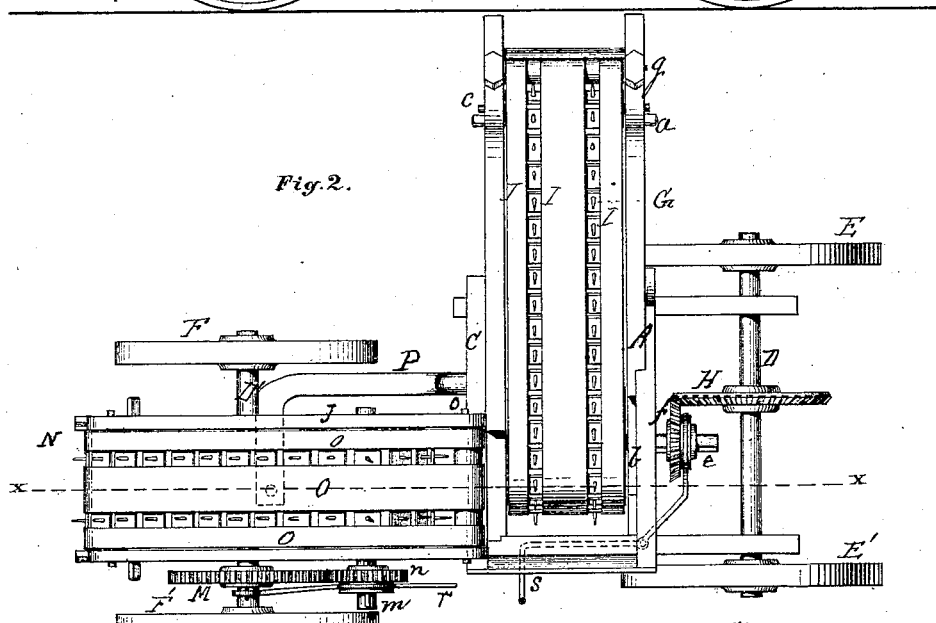
Figure 2 is a top plan view.

To the axle D of the hind wheels is connected a horizontal rectangular frame, C, and upon this, and in the rear of the axle, is placed another frame, A, in a position slightly inclining from an upright, as shown in figs. 1 and 2.

On rollers $a$ and $b$, arranged near the ends of the frame A, is mounted an endless apron, G, consisting of narrow slats, with teeth, $d$, projecting from them, so as to be in line.

The roller $b$, at the lower end of the frame A, is the operating one, and its journal, $e$, projects through the side of the frame toward the axle D, and is provided with a bevel-pinion, $f$, which is geared into by a bevel-wheel, H, rigidly keyed to the axle D.

The journals of the upper roller $a$ run in adjustable boxes, $c$, so that the apron may be arranged to run easily, as desired.

About this apron G, and between its teeth $d$, are arranged endless belts, I, so as to run with it.

These belts run, at the upper end of the frame, around a roller, $g$, placed a short distance beyond the roller $a$, and far enough to allow the teeth $d$ of the apron to pass inside of it, so that the hay that is carried up by the teeth will be lifted and released by the belts from the teeth when it reaches this point, as shown in fig. 2.

On the axle D' of the forward wheels is placed another frame, J, and so as to turn about the axle, and in this frame is mounted another endless apron, N, about rollers $h$, $i$, and L, as clearly shown in fig. 1, the latter being the larger and the driving-roller, its journal, $m$, extending through the frame, and being provided with a pinion, $n$, into which gears a cog-wheel, M, keyed or rigidly attached to the axle D'.

Around the endless apron N are also arranged endless belts, O, which, at the upper end of the frame J, pass about a roller, $o$, so placed that the teeth of the apron may pass inside of it, and the belts carry the hay at this point free from the teeth.

The journals of the roller $h$, in the end of the frame J, are made adjustable, so as to tighten the apron when desired.

The wheels on which the frames, with their endless aprons, are thus mounted, are connected by a bent reach, P, so that the aprons may be at right angles to each other, and so that the upper end of the forward apron N may deliver the hay at the lower end of the apron G, as shown in both figs. 1 and 2.

The pinions $n$ and $f$ are arranged on their shafts, so that, by means of shifting levers $r$ and $s$, they may be thrown in or out of gear with the wheels M and H, respectively.

Figures 3, 4:
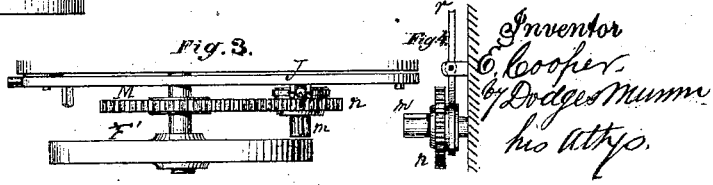
Figures 3 and 4 are modifications of parts detached.

The shifting-lever $r$ may have its fulcrum on the axle D', as shown in fig. 2, or in an arm or bracket attached to the side of the frame J, as shown in figs. 3 and 4, and the shifting-lever $s$ may be arranged in a similar manner, if desired.

As the frame J is arranged to turn on the axle D', its lower end may be held at any desired distance from the ground by means of a chain, R, attached to the frame C, as shown in fig. 2.

Where the ground is very uneven, a board or small piece of sheet-iron may be fastened under the forward end of the frame J, to prevent the teeth of the apron from striking the earth.

In operating a hay-loader thus constructed, it is placed alongside of the wagon to be loaded, and arranged to move with it over the field in which the hay is lying.

The frame J is adjusted so that the teeth in its endless belt will run close to the surface of the ground.

As the machine moves forward, the teeth of the endless apron N pick up the hay and carry it to the upper end of the frame J, where it is lifted free from these teeth by the belts O, and delivered at the lower end of the apron G, by which it is again carried and delivered into the wagon, the apron G being operated by the hind wheels, and the apron N by the forward wheels.

In this way I construct a hay-loader for running alongside of and carrying and delivering into a wagon the hay from the ground in a convenient and expeditious manner.

Having thus described my invention,

What I claim is—

1. In a hay-loader, the two endless aprons N and G, mounted on separate frames J and C, and constructed and arranged to operate in the manner substantially as herein described.

2. In combination with the frames J and C and aprons N and G, mounted on separate running-gear, the chain P, or its equivalent, when arranged substantially as and for the purpose set forth.

4. In combination with the frames upon which the endless aprons are mounted, the bent reach P, when constructed and arranged substantially as herein described, and for the purpose set forth.

EMMETT COOPER.

Witnesses:
V. COOPER,
RICHARD RODENHURST.